United States Patent
Kurien et al.

(10) Patent No.: US 8,078,604 B2
(45) Date of Patent: Dec. 13, 2011

(54) IDENTIFYING EXECUTABLE SCENARIOS IN RESPONSE TO SEARCH QUERIES

(75) Inventors: Thekkthalackal Varugis Kurien, Sammamish, WA (US); Steven E. Jackson, Issaquah, WA (US); Scott A. Field, Redmond, WA (US); Philip J. Lafornara, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 355 days.

(21) Appl. No.: 11/688,037

(22) Filed: Mar. 19, 2007

(65) Prior Publication Data

US 2008/0235179 A1    Sep. 25, 2008

(51) Int. Cl.
G06F 17/30 (2006.01)
(52) U.S. Cl. .................. 707/706; 707/708; 707/999.002
(58) Field of Classification Search .................. None
See application file for complete search history.

(56) References Cited

U.S. PATENT DOCUMENTS

| | | | | |
|---|---|---|---|---|
| 5,148,365 A * | 9/1992 | Dembo | ........................ | 705/36 R |
| 5,546,507 A | 8/1996 | Staub | | |
| 5,664,093 A * | 9/1997 | Barnett et al. | .................. | 714/31 |
| 5,790,780 A * | 8/1998 | Brichta et al. | .................. | 714/46 |
| 6,098,065 A * | 8/2000 | Skillen et al. | ..................... | 707/3 |
| 6,212,545 B1 * | 4/2001 | Ohtani et al. | ................. | 709/202 |
| 6,240,399 B1 | 5/2001 | Frank et al. | | |
| 6,658,598 B1 * | 12/2003 | Sullivan | .......................... | 714/25 |
| 6,767,215 B2 * | 7/2004 | Robertson | ..................... | 434/432 |
| 6,810,401 B1 | 10/2004 | Thompson et al. | | |
| 6,832,218 B1 * | 12/2004 | Emens et al. | .................... | 707/3 |
| 6,907,416 B2 | 6/2005 | Tasooji et al. | | |
| 6,947,917 B1 | 9/2005 | Mathur et al. | | |
| 7,076,443 B1 * | 7/2006 | Emens et al. | ................... | 705/14 |
| 7,089,235 B2 | 8/2006 | Dettinger et al. | | |
| 7,437,338 B1 * | 10/2008 | Forman et al. | ................ | 706/20 |
| 7,505,921 B1 * | 3/2009 | Lukas et al. | ................. | 705/26.5 |
| 7,505,984 B1 * | 3/2009 | Nevill-Manning et al. | ... | 707/101 |

(Continued)

FOREIGN PATENT DOCUMENTS

JP    1998-10-124529    5/1998

(Continued)

OTHER PUBLICATIONS

Office Action in U.S. Appl. No. 11/688,002, dated Apr. 27, 2009, 27 pp.

(Continued)

*Primary Examiner* — Neveen Abel Jalil
*Assistant Examiner* — Jacques Veillard
(74) *Attorney, Agent, or Firm* — Shook Hardy & Bacon L.L.P.

(57) ABSTRACT

Systems, methods, and computer-readable media for identifying executable scenario solutions relevant to a user query and returning such executable scenario solutions as search results in response to the user query are provided. Upon receiving a user query, a plurality of results is returned, each result being representative of a series of steps which may be implemented to address a particular issue relevant to the received user query. Often, a series of steps or scenario includes a number of sub-scenarios, each of which is to be executed sequentially to achieve the desired result. Accordingly, upon selection of a particular search result, the user may be guided through a series of sub-scenario result options until an item having direct association to a series of steps is selected. Once selected, the executable scenario solution is presented to the user for execution.

5 Claims, 4 Drawing Sheets

U.S. PATENT DOCUMENTS

| | | | |
|---|---|---|---|
| 7,797,311 B2 * | 9/2010 | Kurien et al. | 707/722 |
| 7,818,341 B2 * | 10/2010 | Kurien et al. | 707/776 |
| 2002/0052894 A1 * | 5/2002 | Bourdoncle et al. | 707/513 |
| 2002/0072040 A1 * | 6/2002 | Bajer et al. | 434/236 |
| 2002/0184165 A1 | 12/2002 | Deboer et al. | |
| 2003/0008270 A1 * | 1/2003 | Fleishman | 434/322 |
| 2003/0011629 A1 | 1/2003 | Rouse | |
| 2003/0076347 A1 | 4/2003 | Barrett | |
| 2003/0225777 A1 | 12/2003 | Marsh | |
| 2004/0006550 A1 | 1/2004 | Upton | |
| 2004/0095376 A1 | 5/2004 | Graham et al. | |
| 2004/0153428 A1 * | 8/2004 | Reid et al. | 706/50 |
| 2004/0230572 A1 | 11/2004 | Omoigui | |
| 2004/0255243 A1 | 12/2004 | Vincent | |
| 2005/0060350 A1 | 3/2005 | Baum | |
| 2005/0071251 A1 * | 3/2005 | Linden et al. | 705/26 |
| 2005/0080775 A1 | 4/2005 | Colledge et al. | |
| 2005/0091207 A1 | 4/2005 | Shimizu et al. | |
| 2005/0220351 A1 | 10/2005 | Vanderwende et al. | |
| 2005/0289168 A1 | 12/2005 | Green et al. | |
| 2006/0004850 A1 | 1/2006 | Chowdhury | |
| 2006/0190439 A1 * | 8/2006 | Chowdhury et al. | 707/3 |
| 2006/0200371 A1 | 9/2006 | Spector et al. | |
| 2006/0200455 A1 | 9/2006 | Wilson | |
| 2006/0218035 A1 | 9/2006 | Park et al. | |
| 2006/0242017 A1 | 10/2006 | Libes et al. | |
| 2006/0265201 A1 | 11/2006 | Martin | |
| 2006/0265508 A1 | 11/2006 | Angel et al. | |
| 2006/0287919 A1 | 12/2006 | Rubens et al. | |
| 2007/0027894 A1 | 2/2007 | Bridges et al. | |
| 2007/0027919 A1 * | 2/2007 | Mastel | 707/104.1 |
| 2007/0157227 A1 | 7/2007 | Carpenter et al. | |
| 2008/0010132 A1 | 1/2008 | Aaron | |
| 2008/0027804 A1 * | 1/2008 | Kaplan | 705/14 |
| 2008/0109285 A1 | 5/2008 | Reuther et al. | |
| 2008/0177726 A1 * | 7/2008 | Forbes et al. | 707/5 |

FOREIGN PATENT DOCUMENTS

| | | |
|---|---|---|
| JP | 2003085353 A | 3/2003 |
| JP | 2007013409 A | 1/2007 |
| KR | 10-2001-0098004 A2 | 11/2001 |
| KR | 10-2003-0057005 | 7/2003 |
| KR | 10-2006-0043381 | 5/2006 |
| KR | 10-2006-0050484 | 5/2006 |
| WO | 03046761 | 6/2003 |
| WO | 2006009410 | 1/2006 |

OTHER PUBLICATIONS

International Search Report with Written Opinion, Date of mailing: Aug. 11, 2008, U.S. Appl. No. 11/688,002, 12 pp.

Office Action in U.S. Appl. No. 11/688,023, dated Jul. 28, 2009, 18 pp.

International Search Report with Written Opinion, Date of mailing: Jun. 23, 2008, U.S. Appl. No. 11/688,062, 10 pp.

Office Action in U.S. Appl. No. 11/688,023, dated Feb. 27, 2009, 13 pp.

Office Action in U.S. Appl. No. 11/688,062, dated Aug. 14, 2009, 25 pp.

Office Action in U.S. Appl. No. 11/688,062, Mar. 17, 2009, 25 pp.

International Search Report with Written Opinion, Date of mailing: Jul. 28, 2008—U.S. Appl. No. 11/688,037 (PCT/US2008/054990)—14 pp.

Final Office Action in U.S. Appl. No. 11/688,002, dated Jan. 11, 2010, 29 pp.

Office Action in U.S. Appl. No. 11/688,062, dated Jan. 19, 2010, 29 pp.

"UDDI Technical White Paper," Internet Citation, Sep. 6, 2000, XP-002230398, retrieved on Feb. 7, 2003, http://www.uddi.org/pubs/lru_UDDI_Technical_White_Paper.pdf, 14 pp.

"XML Schema Part 1: Structures Second Edition", Oct. 28, 2004, W3C, 151 pp.

Extended EP Search Report, mailed Jan. 15, 2011, in U.S. Appl. No. 11/688,002, 4 pp.

Office Action, dated Jan. 4, 2011, in U.S. Appl. No. 11/688,023, 13 pp.

Office Action, mailed Dec. 22, 2010, in U.S. Appl. No. 12/886,335, 30 pp.

Final Office Action, mailed Jun. 9, 2011, in U.S. Appl. No. 12/886,335, 29 pp.

Final Office Action, mailed Apr. 23, 2010, re U.S. Appl. No. 11/688,023, 18 pp.

* cited by examiner

IDENTIFYING EXECUTABLE SCENARIOS IN RESPONSE TO SEARCH QUERIES

BACKGROUND

Use of online searching as a means to locate desired information has significantly increased in recent years to become one of the most prevalent systems for locating information in use today. Generally, search engines utilize keyword matching to locate information containing identical and/or similar keywords to a search query input by a user. While keyword matching has its advantages over more generic search methods, a significant number of items are often returned in response to a search query, many of which are not related to the core topic intended by the user.

For instance, suppose a user desires to locate a step-by-step account of how to edit digital photographs on his/her personal computer and, accordingly, initiates a search containing the keywords "photographs and editing." In response thereto, a plurality of items is returned to the user, some of which pertain to editing photographs using consumer photograph editing equipment, some of which pertain to editing photographs using commercial photograph editing equipment, and some of which pertain to other photograph editing topics. Upon receiving the results, the user must sort through all returned items to separate those that are relevant to consumer photograph editing from the other returned items. Additionally, while some of the returned items may have reviews or other preference and quality information associated therewith, it is difficult for the user to discern which consumer photograph editing items are "better" than others and/or which reviewers' opinions with which s/he might agree.

Even if the user is able to locate one or more items that appear intriguing from a plurality of keyword search results, since the user's original intent was to determine how to accomplish a particular task (editing photographs), the user will have to sort through the item(s) to determine whether s/he has access to all peripherals (e.g., software programs, and the like) necessary to complete the task. If s/he determines that it would be necessary to acquire a peripheral of some kind, s/he must then figure out the most efficient way to acquire the necessary item. Such sorting and determining can be rather time-consuming and may, in many instances, lead to user frustration and dissatisfaction.

BRIEF SUMMARY

Embodiments of the present invention relate systems, methods, and computer-readable media for identifying executable scenario solutions relevant to a user query and returning such executable scenario solutions as search results in response to the user query. When receiving a user query, it is assumed that the user desires to solve a particular problem or, more precisely, desires to execute a scenario-specific solution and/or achieve a particular result. Thus, each item returned in response to the user query is representative of a particular executable solution. Often, a solution, or "scenario solution" as it is referred to herein, includes a number of sub-scenario solutions, each of which are to be executed sequentially to achieve the desired result. Accordingly, upon selection of a particular search result, the user may be guided through a series of sub-scenario solution result options until selection of an item having direct association to a series of steps implemented by a workflow is selected. Once selected, the series of steps will be presented to the user for execution.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide systems, methods, and computer-readable media for identifying executable scenario solutions relevant to a user query and returning such executable scenario solutions as search results in response to the user query. When receiving a user query, it is assumed that the user desires to solve a particular problem or, more precisely, desires to execute a scenario-specific solution and/or achieve a particular result. Thus, each item returned in response to the user query is representative of a particular executable solution. Often, a solution, or "scenario solution" as it is referred to herein, includes a number of sub-scenario solutions, each of which are to be executed sequentially to achieve the desired result. Accordingly, upon selection of a particular search result, the user may be guided through a series of sub-scenario solution result options until an item having direct association to a series of steps implemented by a workflow is selected. Once selected, the series of steps is presented to the user for execution.

In accordance with embodiments hereof, scenario solutions may be rated, for instance, based on a user-community rating scheme and/or a certification by a certifying body. Thus, in association with each returned scenario solution and/or sub-scenario solution, the user may be presented with a rating indicating how the particular scenario solution or sub-scenario solution compares to other relevant scenario solutions. In other embodiments, the order in which scenario solutions are presented to the user may imply their associative rating, for instance; scenario solutions presented near the top of a vertical listing may be higher rated than scenario solutions presented lower in the listing. In still other embodiments, scenario solutions for which execution would not require the user to acquire any implementation objects (or a limited number of implementation objects) may be rated above those scenario solutions for which the user may have to acquire a number of implementation objects to complete execution.

Accordingly, in one aspect, the present invention provides one or more computer-readable media having computer-executable instructions embodied thereon that, when executed, perform a method for identifying executable scenario solutions in response to search queries. The method includes receiving a scenario-related query (e.g., from an end-user device) and, in response to the received scenario-related query, identifying at least one selectable scenario description that corresponds to an executable scenario solution.

In another aspect the present invention provides a method for creating executable scenario solutions. The method includes receiving a solution, generating a scenario description that corresponds to the solution, and associating the solution and the scenario description to create an executable scenario solution. In embodiments, the method may further include receiving one or more scenario queries that describe how to acquire a particular implementation object necessary for completing execution of the executable scenario solution, and associating the scenario query(ies) with the executable scenario solution.

In a further aspect, the present invention provides a computerized system for receiving and executing scenario solutions. The system includes a scenario solution authoring engine, and end-user device, and a server, all in communication with one another via a network. The scenario solution authoring engine is configured for receiving one or more solutions, generating a scenario description that corresponds to each solution received, and associating the generated scenario description with each corresponding solution to create an executable scenario solution. The end-user device is configured for receiving a scenario-related query, e.g., from an end user. The server is configured for receiving the scenario-related query (for instance, from the end-user device) and the scenario solution and associated scenario description (for instance, from the scenario solution authoring engine).

Having briefly described an overview of embodiments of the present invention, an exemplary operating environment suitable for implementing the present invention is described below.

Figure 1:
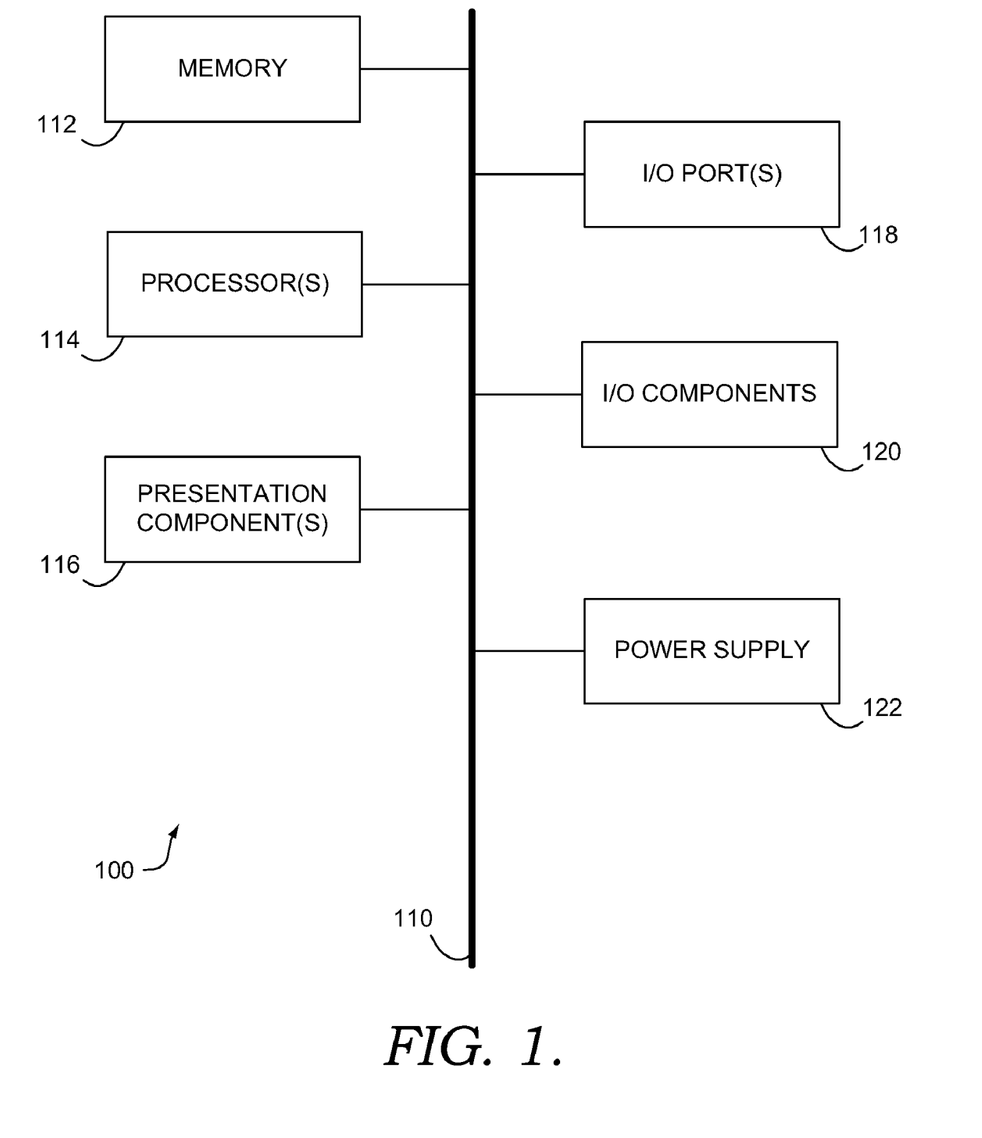
FIG. 1 is a block diagram of an exemplary computing environment suitable for use in implementing embodiments of the present invention.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. Embodiments of the present invention may be practiced in a variety of system configurations, including hand-held devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

As previously mentioned, in one embodiment, the present invention relates to a method for receiving executable scenario solutions (each executable scenario solution being comprised of a scenario description and a solution, as more fully described below), identifying one or more of the executable scenario solutions that are relevant to a search query, and returning the identified executable scenario solution(s) as the result of a search. As the returned solutions are executable objects, upon selection thereof, a user will be guided through a series of steps (e.g., implemented by a workflow) relevant to the search query. In embodiments, the scenario solutions are rated for presentation, such rating being evidenced by a rating indicator or presentation order so that, over time, scenario solutions that are deemed less useful by the user-community and/or a certifying body will be filtered out and those scenario solutions that the user-community and/or a certifying body finds most helpful and/or satisfying, will find their way to a position of higher rating.

Figure 2:
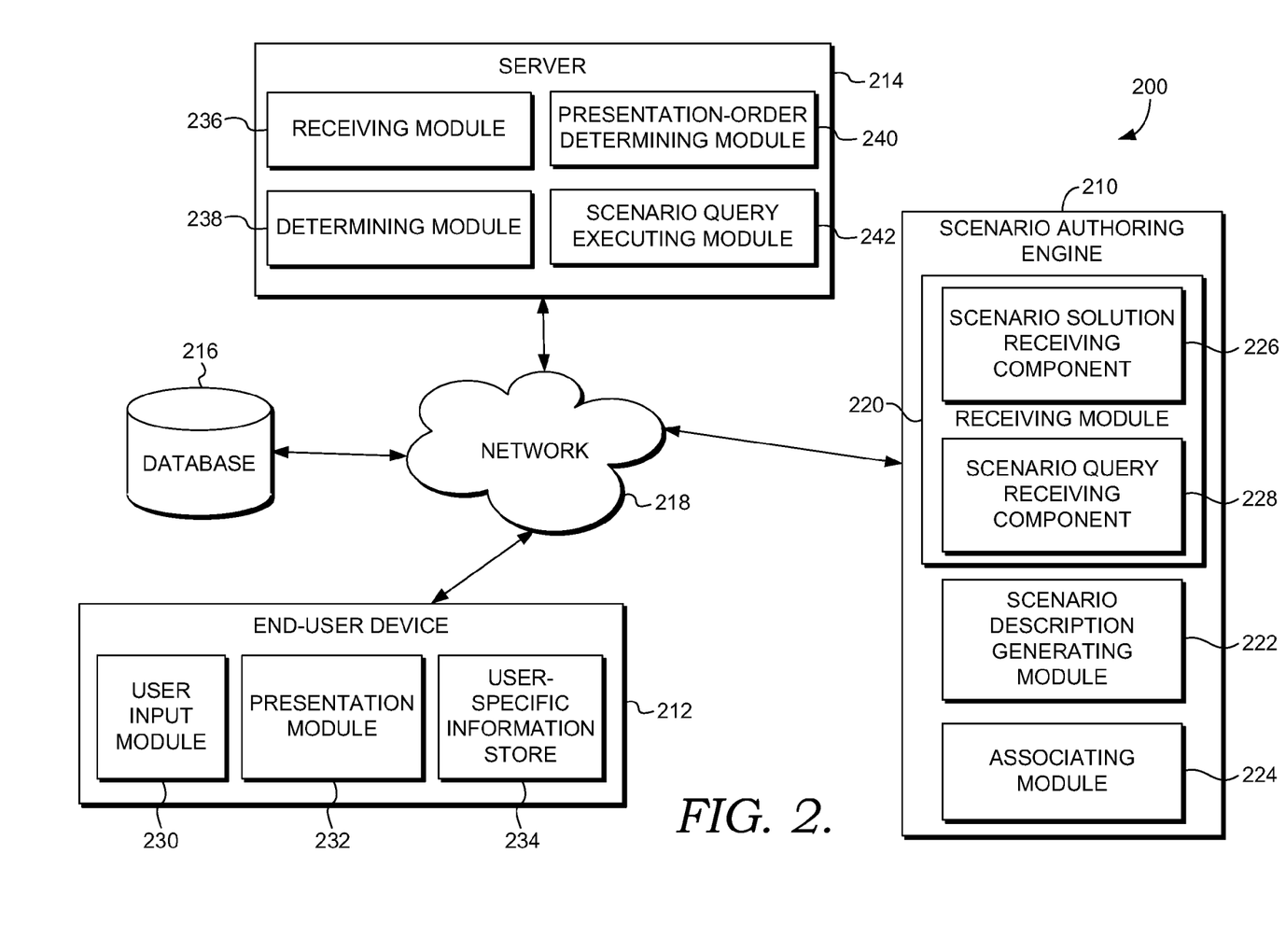
FIG. 2 is a block diagram of an exemplary computing system architecture suitable for use in implementing embodiments of the present invention.

Turning now to FIG. 2, a block diagram is illustrated that shows an exemplary computing system architecture 200 configured for receiving and executing scenario solutions, in accordance with an embodiment of the present invention. It will be understood and appreciated by those of ordinary skill in the art that the computing system architecture 200 shown in FIG. 2 is merely an example of one suitable computing system and is not intended to suggest any limitation as to the scope of use or functionality of the present invention. Neither should the computing system architecture 200 be interpreted as having any dependency or requirement related to any single component/module or combination of components/modules illustrated therein.

Computing system architecture 200 includes a scenario solution authoring engine 210, an end-user device 212, a server 214, and a database 216, all in communication with one another via a network 218. The network 218 may include, without limitation, one or more local area networks (LANs) and/or wide area networks (WANs). Such networking environments are commonplace in offices, enterprise-wide computer networks, intranets and the Internet. Accordingly, the network 218 is not further described herein.

The database 216 is configured to store information associated with at least one executable scenario solution. In various embodiments, such information may include, without limitation, one or more scenario solutions, one or more scenario queries, one or more scenario descriptions, one or more scenario-related queries, and the like. In embodiments, the database 216 is configured to be searchable for one or more of the items stored in association therewith. It will be understood and appreciated by those of ordinary skill in the art that the information stored in the database 216 may be configurable and may include any information relevant to an executable scenario solution. The content and volume of such information are not intended to limit the scope of embodiments of the present invention in any way. Further, though illustrated as a single, independent component, database 216 may, in fact, be a plurality of databases, for instance a database cluster, portions of which may reside on a computing device associated with the scenario solution authoring engine device 210, the end-user device 212, the server 214, another external computing device (not shown), and/or any combination thereof.

Each of a computing device associated with the scenario solution authoring engine 210, the end-user device 212, and the server 214 shown in FIG. 2 may be any type of computing device, such as, for example, computing device 100 described above with reference FIG. 1. By way of example only and not limitation, each of a computing device associating with the scenario solution authoring engine 210, the end-user device 212, and/or the server 214 may be a personal computer, desktop computer, laptop computer, handheld device, mobile handset, consumer electronic device, or the like. It should be noted, however, that the present invention is not limited to implementation on such computing devices, but may be implemented on any of a variety of different types of computing devices within the scope of embodiments hereof.

As shown in FIG. 2, the scenario solution authoring engine 210 includes a receiving module 220, a scenario description generating module 222, and an associating module 224. In some embodiments, one or more of the modules 220, 222 and 224 may be implemented as stand-alone applications. In other embodiments, one or more of the modules 220, 222 and 224 may be integrated directly into the operating system of the scenario solution authoring engine 210 (or a computing device associated therewith). It will be understood by those of ordinary skill in the art that the modules 220, 222 and 224 illustrated in FIG. 2 are exemplary in nature and in number and should not be construed as limiting. Any number of modules may be employed to achieve the desired functionality within the scope of embodiments of the present invention.

Scenario solutions are typically authored by an individual that is an expert in his or her field, an individual that has a particular interest in a field associated with the scenario solution, and/or an individual that has been confronted with the issue that the scenario solution purports to address. Thus, the scenario solution authoring engine 210 is typically accessed by a scenario solution author, for instance, via a user interface (not shown). Upon accessing the scenario solution authoring engine 210, the scenario solution author typically inputs a solution. A "solution," as the term is utilized herein, is essentially a series of steps implemented by a workflow. Accordingly, the receiving module 220 of the scenario solution authoring engine 210 includes a solution receiving component 226 configured for receiving one or more solutions. Solutions are often times comprised of sub-solutions whose sequential execution (e.g., organized via a requires relation) results in successful completion of the scenario solution end-to-end. Thus, the receiving module 220 of the scenario solution authoring engine 210 is further configured for receiving sub-solutions and for associating a plurality of sub-solutions such that they may be executed only in their required order.

It should be noted that scenario solutions may either be authored from scratch or existing scenario solutions may be located and reused (whether modified or unmodified). Further, authoring a scenario solution may be as simple as recording and replaying a search session or it may be more complex, for instance, by executing search queries in the context of a C++ or JavaScript program. Any and all such variations are contemplated to be within the scope of embodiments hereof.

Often, successful completion of a scenario solution requires one or more peripheral objects or enablers. An "enabler," as the term is utilized herein, may include, for instance, a document, a software/hardware object and/or a person or organization that freely (or for financial gain) implements a scenario solution. It will be understood and appreciated by those of ordinary skill in the art that the listed enablers are provided by way of example only and that embodiments of the present invention are not so limited. Any object that implements a solution or sub-solution may be considered an enabler within embodiments hereof.

Users often have access to some of the enablers needed to execute a particular scenario solution but not to others. Determining which enablers s/he has access to, which enablers s/he does not have access to, and how to acquire any enablers s/he does not have access to can often be a rate-limiting factor when it comes to executing scenario solutions. Accordingly, in embodiments, a scenario solution author will create scenario queries designed to retrieve any enabler required for successful execution of an authored scenario solution. Thus, the receiving module 220 of the scenario solution authoring engine 210 further includes a scenario query receiving component 228 configured for receiving a scenario query corresponding to at least one scenario solution received, e.g., utilizing the solution receiving component 226.

In addition to one or more solutions (and one or more scenario queries, if applicable), scenario solutions are comprised of a scenario description. A "scenario description," as the term is utilized herein, is a webpage that describes an executable scenario solution. Scenario descriptions are typically located by keyword search (the keywords being derived from a scenario-related query, as more fully described below)

and selectable identifiers thereof are presented in response to a search. Thus, the scenario description generating module 222 of the scenario solution authoring engine 210 is configured for generating a scenario description for each scenario solution received by the solution receiving component 226 of the receiving module 220. Such description may be generated by any number of methods including, but not limited to, receipt of a description from the scenario solution author, extraction of one or more keywords from the corresponding scenario solution, or the like. It will be understood and appreciated by those of ordinary skill in the art that embodiments of the present invention are not intended to be limited to any particular system or method for generating scenario descriptions. Any number of known description-generating methods may be utilized in accordance with embodiments hereof.

The associating module 224 is configured for associating each scenario description generated utilizing the scenario description generating module 222 with the corresponding solution to create an executable scenario solution. The associating module 224 is further configured for associating a received scenario query with the corresponding scenario solution.

Once a scenario solution author completes the authoring of an executable scenario solution, the scenario solution is published such that it may be searched upon receipt of a scenario-related query, as more fully described below. Systems and methods for publishing information in a network environment so that it may be accessible by other users are known in the art and, accordingly, are not further described herein. Embodiments of the present invention are not limited to any particular publication system/method.

As shown in FIG. 2, the end-user device 212 includes a user input module 230, a presentation module 232, and a user-specific information store 234. In some embodiments, one or more of the modules 230, 232 and 234 may be implemented as stand-alone applications. In other embodiments, one or more of the modules 230, 232 and 234 may be integrated directly into the operating system of the end-user device 212. It will be understood by those of ordinary skill in the art that the modules 230, 232 and 234 illustrated in FIG. 2 are exemplary in nature and in number and should not be construed as limiting. Any number of modules may be employed to achieve the desired functionality within the scope of embodiments of the present invention.

The user input module 230 is configured for receiving input of a scenario-related query. As previously described, when utilizing a system in accordance with an embodiment of the present invention, all queries received from an end-user (e.g., a user associated with end-user device 212) are assumed to be presented for the purpose of solving a particular problem and/or addressing a particular issue. Thus, all queries received via user input module 230 of the end-user device 212 are considered "scenario-related queries." Typically, scenario-related queries are input via a user interface (not shown) associated with the end-user device, or the like.

The presentation module 232 of the end-user device 212 is configured for presenting scenario descriptions and/or scenario solutions that correspond to a received scenario-related query. In one embodiment, the presentation module 232 presents a scenario description and/or a scenario solution utilizing a display device associated with the end-user device 212. Embodiments of the present invention, however, are not intended to be limited to visual display but rather may also include audio presentation, combined audio/video presentation, and the like.

The user-specific information store 234 is configured for storing scenario-solution related information that is specific to a user associated with the end-user device 212. Such information may include, by way of example only, metadata associated with one or more enablers the user acquired during a previous scenario solution execution, one or more executed-scenario solution instances (that is, information pertaining to prior executed scenario solutions), metadata related to a user group to which the user belongs, and the like. In embodiments, the scenario-solution related information stored in association with the user-specific information store is configured to be searched to determine information to which the user has ready access, as more fully described below.

As shown in FIG. 2, the server 214 includes a receiving module 236, a determining module 238, a presentation-order determining module 240, and a scenario query executing module 242. In some embodiments, one or more of the modules 236, 238, 240 and 242 may be implemented as stand-alone applications. In other embodiments, one or more of the modules 236, 238, 240 and 242 may be integrated directly into the operating system of the server 214. It will be understood by those of ordinary skill in the art that the modules 236, 238, 240 and 242 illustrated in FIG. 2 are exemplary in nature and in number and should not be construed as limiting. Any number of modules may be employed to achieve the desired functionality within the scope of embodiments of the present invention.

The receiving module 236 is configured for receiving at least one of a scenario solution, a scenario query, and a scenario description, e.g., from the scenario authoring engine 210. The receiving module 236 is further configured for receiving at least one scenario-related query, e.g., from the end-user device 212. In embodiments, once received, the receiving module 236 may transmit the received scenario-related information for storage, for instance, in association with database 216.

The determining module 238 is configured for determining at least one scenario description that corresponds to a received scenario-related query (e.g., a query received from end-user device 212). In one embodiment, the determining module 238 queries the database 216 for scenario descriptions stored in association therewith that include identical and/or similar keywords to the received scenario-related query. Embodiments of the present invention, however, are not limited to database query operations but may employ any known methods for determining information relevant to a particular criterion known to those of ordinary skill in the art.

In embodiments, the determining module 238 may be further configured for determining if at least one enabler is necessary to execute a scenario solution determined to correspond to the received scenario-related query. In one embodiment, the determining module 238 queries the database 216 for scenario queries associated with a relevant scenario solution. Again, however, embodiments of the present invention are not intended to be limited to such database query operations.

If desired, the determining module 238 may be further configured for transmitting at least one scenario description (e.g., via network 218) determined to be relevant to the received scenario-related query for presentation to the user that initiated the query, for example, utilizing presentation module 232 of end-user device 212. Prior to such transmission, however, if more than one scenario description is determined to be relevant to the received scenario-related query, a presentation order and/or other means of indicating to a user the associative relevance and/or usefulness of a scenario solution identified by a particular scenario description may be determined. Thus, the presentation-order determining module 240 is configured for determining an order for scenario description presentation and/or otherwise indicating associative relevance and/or usefulness of various scenario solutions prior to presentation.

Rating is used to restrict scenario solutions (and enablers) that are presented to a user, hence increasing relevance and/or usefulness. Thus, in one embodiment, members of a user-community are provided the opportunity to rate scenario solutions and enablers with respect to relevance and usefulness. Further, if desired, members of the user-community may be provided the opportunity to rate scenario solution authors. The rating is typically a numeric value that can be presented to the user-community in any way. For instance, a rating of one to five stars may be visually provided upon presentation of a scenario solution or enabler, presentation order may be determined based upon assigned ratings, wherein the corresponding numeric rating may or may not also be provided to the user, and the like. Embodiments of the present invention, however, are not intended to be limited to any particular rating scheme, allowing any number of ratings attributes to be attached to a scenario solution, enabler, or scenario solution author. However, generally, a standardized set of attributes will be adhered to with respect to a particular user-community to enable accurate comparisons between entities (i.e., scenario solutions, enablers, scenario solution authors, and the like). Exemplary attributes may include, without limitation, usefulness (how useful is the entity), accuracy (how accurate is the entity), detail (how detailed is the entity), and cost (how costly is the entity). As will be understood by those of ordinary skill in the art, standardized attributes provide the user-community with a view into the entity that uniquely and immediately describes trust, verification, and value.

Embodiments of the present invention further contemplate ranking of scenario solutions and/or enablers based upon certification criteria set forth by a certifying body. As will be understood by those of ordinary skill in the art, certification is another way in which a user may be provided with a view into an entity that comments upon the entity's trust, verification, and value.

Embodiments of the present invention further contemplate ranking a plurality of relevant scenario solutions based upon the number of enablers the querying user will have to acquire to complete execution of the scenario solution. In this regard, one of the presentation-order determining module 240 and the determining module 238 may be further configured for querying the user-specific information store 234 associated with the end-user device 212 to determine a set of enablers (and, possibly, the enablers' corresponding features) to which the user has access. This information may then be compared to a set of enablers necessary for completion of a relevant scenario solution to determine the number of enablers the user may have to acquire for completion. All relevant scenario solutions may then be presented with ranking indications corresponding to the number of enablers needed (e.g., those scenario solutions for which the user has access to all required enablers may be presented at the top of the vertical listing with the others sequentially taking position lower on the list) or only scenario solutions requiring acquisition of fewer than a threshold number of enablers may be presented. Any and all such variations are contemplated to be within the scope of embodiments hereof.

The scenario query executing module 242 is configured for executing at least one scenario query if it is determined that at least one enabler is necessary to execute a scenario solution determined to be relevant to the received scenario-related query. Generally, a user will be asked whether or not s/he desires such enabler acquisition and, if acquisition is declined, an execution state of infeasible and/or enabler-not-present may be attributed to the scenario solution and execution thereof denied.

Figure 3:
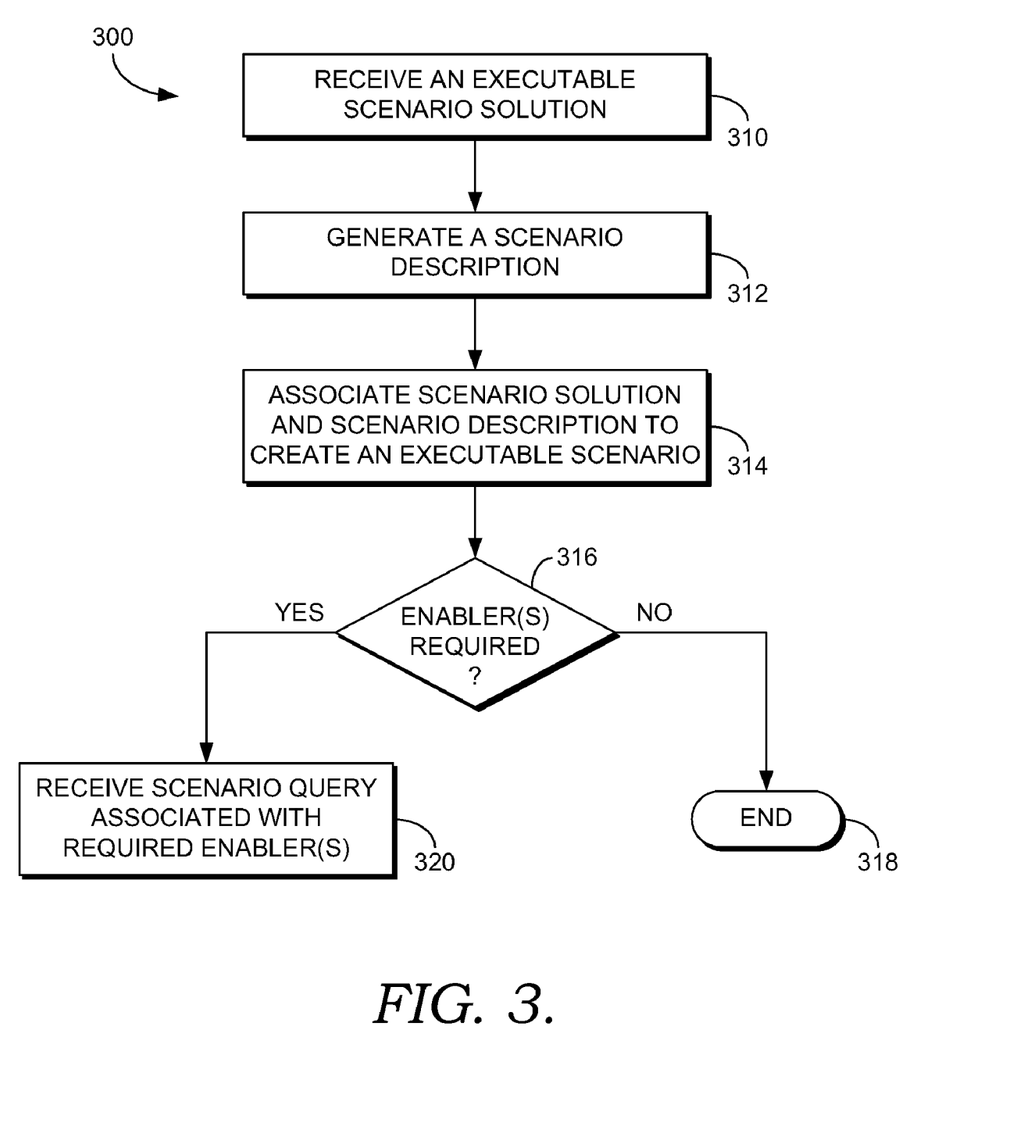
FIG. 3 is a flow diagram illustrating a method for creating executable scenario solutions, in accordance with an embodiment of the present invention.

Turning now to FIG. 3, a flow diagram is shown illustrating a method 300 for creating executable scenario solutions, in accordance with an embodiment of the present invention. Initially, as indicated at block 310, a solution (that is, a solution authored by a scenario solution author as described hereinabove) is received, e.g., utilizing solution receiving component 226 of FIG. 2. For example, a series of steps for cropping photographs on a personal computer having software A installed thereon may be received. Subsequently, a scenario description is generated, e.g., utilizing scenario description generating module 222 of FIG. 2, as indicated at block 312. As previously described, a scenario description may be generated by any number of methods including, but not limited to, receipt of a description from the solution author, extraction of one or more keywords from the corresponding solution, or the like. It will be understood and appreciated by those of ordinary skill in the art that embodiments of the present invention are not intended to be limited to any particular system or method for generating scenario descriptions and that any number of known description-generating methods may be utilized in accordance with embodiments hereof. Referring back to the above example, a scenario description of "software A photograph cropping" may be input by the solution author and generated utilizing scenario description generating module 222.

Next, as indicated at block 314, the solution and the generated scenario description are associated with one another to create an executable scenario solution, e.g., utilizing associating module 224 of FIG. 2. Subsequently (or substantially simultaneously) it is determined whether one or more enablers (that is, objects necessary for implementing the scenario solution) are required to complete execution of the received scenario solution. This is indicated at block 316. For instance, compatible software B or camera X may be required for cropping photographs utilizing software A. If it is determined that completing execution of the scenario solution does not require any enablers, the method ends, as indicated at block 318. However, if it is determined at block 316 that one or more enablers is required for completing execution of the scenario solution, a scenario query associated with each required enabler is subsequently received, as indicated at block 320. As previously described, a scenario query is designed to retrieve any enabler required for successful execution of an authored scenario solution. For instance, referring to the above example, a scenario query may be received that provides a link to a website from which software B may be downloaded and/or a scenario query may be received that provides a link to a website from which camera X may be purchased. Upon receipt of a scenario query, such scenario query may be associated with the corresponding scenario solution, for example, utilizing associating module 224.

Once all scenario queries have been received and properly associated with the corresponding scenario solutions, or if it is determined (at block 316) that the received scenario solution does not require any enablers for completing execution thereof, the executable scenario solution may be transmitted, for example, to database 216 (via network 218) for storage.

Figure 4:
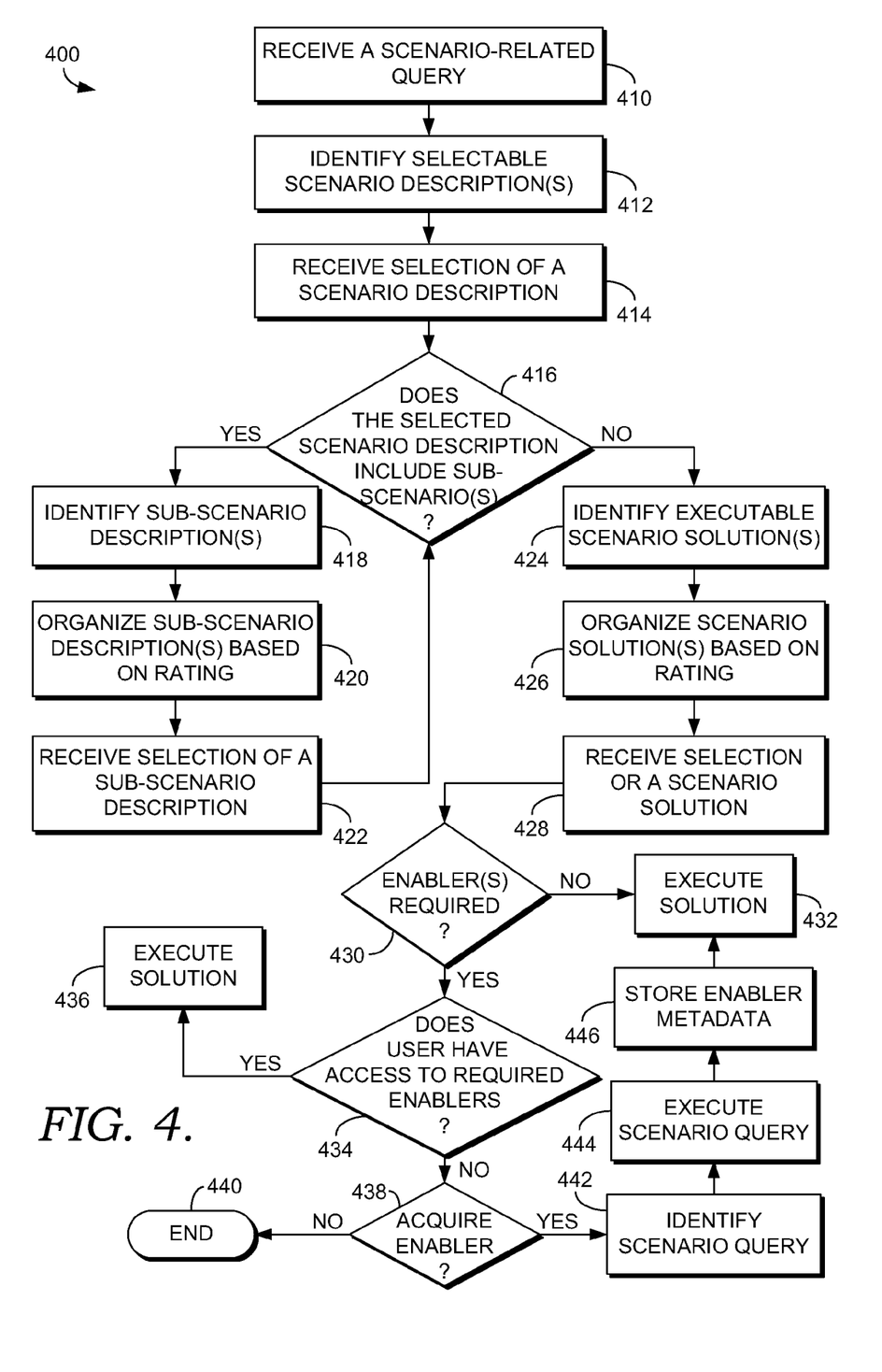
FIG. 4 is a flow diagram showing a method for identifying executable scenario solutions in response to search queries, in accordance with an embodiment of the present invention.

Turning now to FIG. 4, a flow diagram is shown illustrating a method 400 for identifying executable scenario solutions in response to search queries, in accordance with an embodiment of the present invention. Initially, as indicated at block 410, a scenario-related query is received (e.g., utilizing receiving module 236 of FIG. 2). In one embodiment, the scenario-related query may be input by a user associated with the end-user device 212, for instance, utilizing user input module 230, and such scenario-related query may be transmitted (e.g., via network 218) to the server 214 and processed by the receiving module 236. For example, a user may input a scenario-related query of "PC photograph cropping with software A."

Subsequently, as illustrated at block 412, one or more selectable scenario descriptions that are relevant to the received scenario-related query are identified, e.g., utilizing determining module 238 of FIG. 2. As previously described, in one embodiment, the determining module 238 queries the database 216 for scenario descriptions stored in association therewith that include identical and/or similar keywords to the received scenario-related query. Embodiments of the present invention, however, are not limited to database query operations but may employ any known methods for determining information relevant to a particular criterion known to those of ordinary skill in the art. Referring to the above-example, the scenario description "software A photograph cropping" may be identified from the database 216.

The identified selectable scenario description(s) may subsequently be transmitted, for example, via network 218, to a presentation device associated with end-user device 212 of FIG. 2. A user may subsequently select one of the displayed selectable scenario descriptions and such selection may be received, for instance, by receiving module 236 of FIG. 2, as indicated at block 414. For instance, the user may select the scenario description "software A photograph cropping." Subsequently, it is determined (for instance, utilizing determining module 238 of FIG. 2) whether the selected scenario description includes one or more sub-solutions in association therewith. This is indicated at block 416. For instance, the scenario solution associated with the description "software A photograph editing" may include a sub-solution for downloading photographs from camera X, a sub-solution for saving downloaded photographs prior to cropping, and a sub-solution for cropping saved photographs—the sequential execution of which results in execution of the scenario solution.

If it is determined that the selected scenario description does include one or more sub-solutions associated therewith, a sub-solution description corresponding to each sub-solution is identified, as indicated at block 418. Next, as indicated at block 420, the sub-solution descriptions are organized for presentation, e.g., based on a user-community rating scheme, certification criteria, or the like. The sub-solution descriptions may subsequently be transmitted, for instance, utilizing network 218, to a presentation device associated with the end-user device 212 of FIG. 2. A user associated with the end-user device 212 may subsequently select one of the sub-solution descriptions and such selection may be received (e.g., by receiving module 236), as indicated at block 422. It is subsequently determined whether the selected sub-solution description includes further sub-solutions (e.g., utilizing determining module 238), as indicated at block 416. If it is determined that the selected sub-solution description does include one or more sub-solutions associated therewith, the steps indicated at blocks 418, 420, and 422 are repeated until a sub-solution having no further sub-solutions associated therewith is selected by the user.

Once it is determined, at block 416, that a solution or sub-solution for which a description was selected by the user does not include any further sub-solutions associated therewith, one or more executable scenario solutions associated with the selected scenario or sub-scenario description is identified, as indicated at block 424. Subsequently, as indicated at block 426, the identified scenario solutions are organized for presentation, for instance, utilizing a user-community rating scheme, certification criteria, or the like. The scenario solutions may subsequently be transmitted, for instance utilizing network 218 of FIG. 2, to a presentation device associated with end-user device 212.

A user associated with the end-user device 212 may subsequently select one of the presented scenario solutions for execution and such scenario solution selection may be transmitted (for instance, via network 218) and received, e.g., utilizing receiving module 236 of FIG. 2. This is indicated at block 428.

Next, as indicated at block 430, it is determined if one or more enablers (that is, objects required to implement the scenario solution) is required for completing execution of the selected scenario solution. If it is determined that no enablers are required for execution, the scenario solution is executed and a scenario solution state of "complete" is associated therewith. This is indicated at block 432. If, however, it is determined at block 430 that one or more enablers is required for completing execution of the selected scenario solution, it is next determined whether or not the user has access to the required enabler(s). This is indicated at block 434. Whether a user has access to a required enabler may be determined, for instance, by mining data (e.g., metadata) associated with the user-specific information store 234.

If it is determined that the user does have access to all required enabler(s), the scenario solution is executed and a scenario solution state of "complete" is associated therewith. This is indicated at block 436. If, however, it is determined at block 434 that the user does not have access to one or more required enablers, the user is queried to determine whether s/he would like to acquire the necessary implementation objects. This is indicated at block 438. If it is determined that the user does not wish to acquire one or more of the required enablers, the method terminates, as indicated at block 440, and a scenario solution state of "infeasible" is associated therewith.

If, however, it is determined at block 438 that the user does desire to acquire the required enabler(s), the scenario query associated with acquisition of the required enabler that was authored by the scenario solution author (e.g., the link to the website to download software B and/or purchase camera X) and that corresponds to the selected scenario solution is identified. This is indicated at block 442. Subsequently, the identified scenario query is executed, as indicated at block 444, and metadata associated therewith is stored, for instance, in association with the user-specific information store 234 associated with the end-user device 212. Accordingly, if the user desires to execute another scenario solution at a future point in time that requires the acquired enabler, s/he will be deemed to have already acquired the implementation object. Subsequently, the identified scenario solution is executed and a scenario solution state of "complete" is associated therewith. This is indicated at block 432.

As can be understood, embodiments of the present invention provide systems, methods, and computer-readable media for identifying executable scenario solutions relevant to a user query and returning such executable scenario solutions as search results in response to the user query. Upon receiving a user query, a plurality of results is returned, each result being representative of a series of steps that may be implemented to address a particular issue relevant to the received user query. Often, a scenario solution includes a number of sub-solutions, each of which is to be executed sequentially to achieve the desired result. Accordingly, upon selection of a particular search result, the user may be guided through a series of sub-solution result options until an item having direct association to a series of steps is selected. Once selected, the scenario solution is presented to the user for execution.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more memory hardware computer-storage media storing computer-executable instructions embodied thereon that, when executed, perform a method for identifying executable scenario solutions in response to search queries, the method comprising:
   receiving a scenario-related query on a computing device, wherein the scenario-related query seeks a solution and indicates an intent to execute a specific solution and achieve a result;
   in response to the received scenario-related query, identifying one or more selectable scenario descriptions, each selectable scenario description describing only one corresponding executable scenario solution, wherein the executable scenario solution comprises a scenario description and a solution which is directly associated with one or more steps implemented by a workflow, wherein at least one executable scenario solution requires one or more peripheral software object enablers, the one or more peripheral software object enablers being software which is required to be executed in addition to the executable scenario solution for successful execution of the executable scenario solution, and wherein the peripheral software object enabler corresponds to a scenario query, the scenario query being previously stored as a part of the executable scenario solution and; being a query suitable for acquiring the peripheral software object enabler;
   determining that the one or more peripheral software object enablers for the at least one executable scenario solution have been previously acquired;
   determining a presentation order for the identified scenario descriptions by organizing the one or more corresponding executable scenario solutions based on an associative rating indicating in part the number of peripheral software object enablers the user will have to acquire to complete execution of the executable scenario solution;
   presenting the one or more identified selectable scenario descriptions in the determined presentation order;
   receiving a selection of a scenario description from the at least one identified selectable scenario description;
   implementing the one or more steps of the workflow of the executable scenario solution corresponding to the selected scenario description; and
   executing the one or more peripheral software object enablers during implementation of the one or more steps of the workflow to successfully complete execution of the executable scenario solution, wherein if it is determined that one or more peripheral software object enablers are is required to execute the at least one executable scenario solution, determining if the user has metadata associated with the one or more required peripheral software object enablers stored in association with a user-specific information store.

2. The one or more computer-storage media of claim 1, wherein the method further comprises:
   in response to the received scenario-description selection, identifying one or more selectable sub-scenario descriptions and corresponding executable sub-scenario solutions, wherein the one or more selectable sub-scenario descriptions describe the corresponding executable sub-scenario solutions, wherein the one or more executable sub-scenario solutions when executed sequentially achieve the result intended by the user.

3. The one or more computer-storage media of claim 2, wherein identifying one or more selectable sub-scenario descriptions and corresponding executable scenario solution comprises identifying a plurality of selectable sub-scenario descriptions, and wherein each of the plurality of selectable sub-scenario descriptions is attributed an associative rating.

4. The one or more computer-storage media of claim 2, wherein identifying one or more selectable sub-scenario descriptions and corresponding executable scenario solution comprises identifying a plurality of selectable scenario solutions, and wherein each of the plurality of executable scenario solutions is attributed an associative rating.

5. The one or more computer-storage media of claim 2, wherein identifying one or more selectable sub-scenario descriptions and corresponding executable scenario solution comprises identifying at least one executable scenario solution, and wherein the method further comprises: receiving a selection of the identified at least one executable scenario solution; and automatically determining if one or more peripheral software object enablers is required in addition to the executable scenario solution to execute the at least one executable scenario solution.

* * * * *